March 14, 1967   J. D. PARKER ET AL   3,308,852
FLOW CONTROL VALVE
Filed Dec. 20, 1963
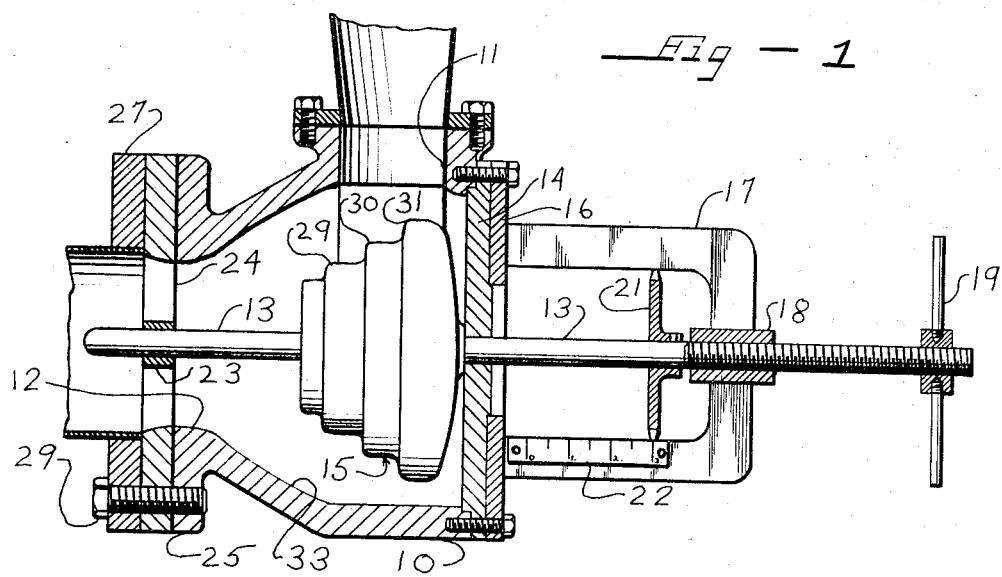
Fig — 1
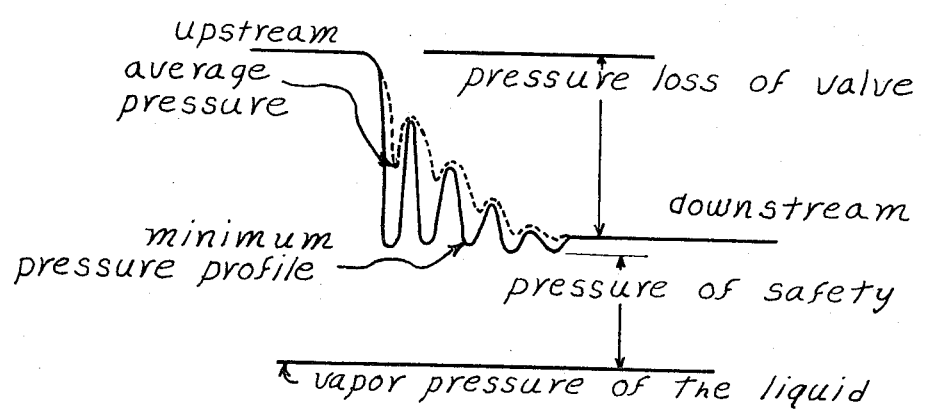
Fig — 2
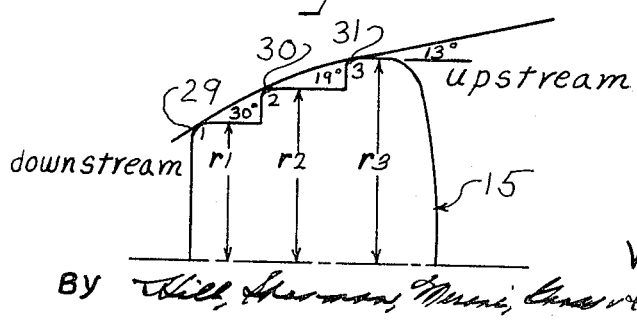
Fig — 3
INVENTORS
Joseph D. Parker
John F. Schmaeng
Walter C. Mih
BY
ATTORNEYS United States Patent Office 3,308,852
Patented Mar. 14, 1967

3,308,852
FLOW CONTROL VALVE
Joseph D. Parker, Beloit, Wis., and John F. Schmaeng, Rockton, and Walter C. Mih, South Beloit, Ill., assignors to Beloit Corporation, Beloit, Wis., a corporation of Wisconsin
Filed Dec. 20, 1963, Ser. No. 332,126
6 Claims. (Cl. 138—46)

This invention relates to improvements in valves and more particularly relates to an improved form of plug valve particularly adapted for controlling pulp flow.

Pulp in suspension in water is essentially an incompressible fluid, and when the pressure of the water or the fiber-water mixtures are lower in any part of the flow than the vapor pressure of the fluid, cavitation occurs, with the resultant pitting and damage to the valve and the generation of large flow disturbances.

Besides shortening the life of the valve, the flow disturbances cause non-uniformity in the sheet with a resultant waste of paper and loss of time.

The basic principle of reducing the tendency for a valve to cavitate is to distribute the pressure loss across the valve, and in carrying out our invention we do this with a series of restrictions so that a lower pressure drop and lower flow velocity occurs across any one restriction of the valve. These restrictions and resultant lower pressure drop and flow velocity, coupled with the valve size, sharpness of curvature of the steps of the restrictions and shape of the body wall, all cooperate to minimize valve cavitation, it being understood that the optimum valve design in a qualitative sense may vary with each installation. A valve constructed like the valve of the present invention, however, for all practical purposes, will give materially improved results over a wide range of installations.

A principal object of the present invention is to provide a flow control valve for pulp and the like, so constructed and arranged as to minimize the cavitation tendency of the valve.

Another object of the invention is to improve upon the flow control valves heretofore in use by so constructing and arranging the valve to provide a wider range of control of the flow through the valve, with a more nearly linear relationship between the flow rate and the valve stem travel.

Still another object of the invention is to eliminate cavitation in a valve, by providing a stepped valve member and by contouring the valve chamber in the form of a seat conforming to the stepped form of the valve member, and in effect presenting a series of axisymmetric flow restrictions to the flow of fluid along the valve chamber.

These and other objects of the invention will appear from time to time as the following specification proceeds and with reference to the accompanying drawing wherein:

FIGURE 1 is a sectional view of a valve constructed in accordance with the principles of the present invention, showing the valve member and stem in side elevation;

FIGURE 2 is a pressure curve of the flow of fluid through the valve shown in FIGURE 1; and FIGURE 3 is a diagrammatic view of one-half of the valve member.

In the embodiment of the invention illustrated in the drawing, we have shown in FIGURE 1 a valve casing or body 10 having an inlet 11 leading through a side wall thereof and an outlet 12 leading through an end wall thereof, coaxially of a valve stem 13. The valve stem 13 is shown as being guided in an end cap 14, closing the opposite end of the valve body from the outlet 12 and as extending through said end cap. A valve member 15 in the form of a plug, is mounted on said stem within the valve chamber, intermediate the ends thereof. The end cap 14 is held in position by a plate 16 secured to the wall of the valve body as by machine screws or a like securing means. A yoke 17 is shown as extending outwardly of the plate 16 and as having central internally threaded hub 18 through which the valve stem 13 is threaded. A hand grip 19 is threaded on the outer end of the stem 13 and suitably secured thereto, to turn the stem 13 by hand and move the valve member 15 toward and from the outlet 12. While the stem 13 is shown as being threaded in the hub 18, it should be understood that the valve member need not be threaded within the hub but may be slidable along the hub and may be operated by an air motor, hydraulic cylinder and piston or any other suitable means.

An indicator wheel 21 is mounted on the stem 13 within the margins of the yoke 17 and cooperates with indicia 22 on a leg of the yoke 17, to indicate the open position of the valve.

The opposite end of the stem 13 is shown as extending from the valve member 15 in a downstream direction, and is guided in a boss 23 carried by a spider 24, abutting a flanged end portion 25 of the valve body, extending about the outlet 12. The spider 24 is retained to the valve body by machine screws 26 extending through a collar 27 and through the spider 24 and threaded in the flange 25. The valve member or plug 15 is round in transverse section and is shown as having three stepped valve faces 29, 30 and 31 cooperating with a generally conical or contoured wall or seat 33 of the valve chamber generally conforming to the stepped valve faces 29, 30 and 31 to provide axisymmetric annular restriction in series to the flow of fluid from the inlet to the outlet of the valve.

At each step or restriction of the valve, when the area of the flow passage is small and the velocity is high, the average pressure will drop according to the total energy balance and the loss between the two steps. The average pressure at contraction area of the valve is, therefore, usually much smaller than the upstream pressure and the average flow of fluid through the valve as shown in FIGURE 2.

In addition, the streamlining of the flow must follow a certain curve in the contraction area and the curvilinear motion of the liquid results in an uneven pressure distribution in the contraction area. When the uneven pressure distribution is superimposed on the average pressure at the contraction area, the minimum pressure is much lower than its average pressure, as also shown in FIGURE 2.

This minimum pressure as indicated in FIGURE 2 has a minimum pressure profile, which is the same for each area of restriction and is attained by the particular valve member or plug shown in detail in FIGURE 3 in cooperation with the internal wall 33 of the valve body 10, in which the angle of the wall or seat 33 for the first step slopes at an angle of substantially 30 degrees, and gradually curves to a slope of substantially 19 degrees for the second step and continues to curve to a slope of substantially 13 degrees for the third step, the angles in each case being one-half of the included angle of the valve chamber and being attained by various radii and lengths of the individual stepped portions which may be calculated. In the present valve member, the radii $r^1$, $r^2$ and $r^3$ may be two inches, two and one-half inches and three inches respectively, and the cooperation of the steps and lengths of the runs of the steps or restrictions 29, 30 and 31 with the wall or seat 33, provide a pressure profile like that of FIGURE 2 in which the minimum pressure at each step of the valve is the same and the average pressure for each step of the valve is reduced in accordance with the displacement of the valve member 15. The radii and length of the steps may of course be varied for various sizes of valves, but it has been found that the chamber contour and valve plug proportions herein shown are particularly well suited to attain a drop to the same minimum pressure for each step of the valve.

The curve of FIGURE 2 is an exemplary pressure curve of a valve constructed like the valve of the drawing. This curve shows that for the particular back pressure of the valve considered, the minimum pressure profile at the various steps of the valve is above the vapor pressure of the valve. This is the result of the lower pressure drop and lower flow velocity across the restrictions of the valve and coupled with the curvature of the valve body and valve shape and size, materially minimizes cavitation of the valve. The cooperation of the valve member 15 with the valve seat or wall 33 also provides a valve passage having three axisymmetric annular restrictions in series, which coupled with the size and shape of the valve shown and curvature of the valve body wall or seat provides smooth flow paths in which the clearances are such that the velocities through the restrictions are substantially equal.

It may here be seen that this distribution of restrictions or annular passages makes a large pressure loss possible without having to develop excessively high velocities, and that the valve does away with sharp corners and particularly at the corners of the steps or restrictions, and thereby minimizes the promotion of undesirable localized cavitation caused by sharp corners of the valve.

It may further be seen that the axisymmetric design of the valve allows for compactness of the valve with less downstream disturbance and that the valve member or plug 15 may be moved to the extreme off position shown in FIGURE 1, where the valve member is recessed in the elbow cavity at the full open position of the valve. In such a position of the valve plug, the hydraulic resistance is reduced to no more than that of a 90° elbow, and when the valve is moving toward a restricted position, the areas of flow restriction are smoothly and steadily diminished with increasing valve stem movement.

While we have herein shown and described one form in which our invention may be embodied, it may readily be understood that various variations and modifications in the invention may be attained without departing from the spirit and scope of the novel concepts thereof.

We claim as our invention:

1. A flow control valve particularly adapted for controlling the flow of incompressible fiber-water mixtures comprising a valve body having a valve chamber therein, closed at one end and open at its opposite end and providing an outlet leading axially of said valve body, an inlet into said valve body through the wall thereof and adjacent the closed end of said body, a valve stem extending axially of said valve body through said closed end and mounted for movement along said valve body, a valve plug, circular in cross section, mounted on said stem and converging from the upstream to the downstream end thereof, said valve chamber having an internal converging wall downstream of said inlet and in the form of a gradual curve of greater radius near said inlet than said outlet and generally conforming to the form of said valve plug, said valve plug having a series of steps therein having rounded corners of different predetermined radii increasing from the downstream to the upstream end of said plug, in which a line extending along the terminal edges of said steps forms a curve conforming to the wall of said valve chamber and cooperating therewith to provide a plurality of axisymmetric rounded corners restrictions to the flow of fluid from said inlet through said outlet upon movement of said valve plug toward valve closing positions.

2. A flow control valve particularly adapted for controlling the flow of incompressible fiber-water mixtures comprising a valve body having a valve chamber therein and having an inlet leading into said chamber adjacent one end thereof and an outlet leading from the opposite end of said chamber, a valve stem extending along said valve chamber axially of said outlet and mounted for movement along said chamber, a valve plug circular in cross-section mounted on said stem and converging from the upstream to the downstream end thereof, said valve plug having a series of steps therein of different predetermined radii in which a line extending along said steps from the inlet to the outlet end thereof forms a slightly convex curve of a predetermined form, and said valve chamber having an interior wall of greater radius near the upstream than the downstream end thereof and in the form of a gradual curve having a slope of generally 30° near the downstream end thereof terminating into a slope of generally 19° intermediate the ends thereof and into a slope of generally 13° at the upstream end thereof, and the steps of said valve plug being of different lengths and of such radii that a curvilinear line drawn through the edges of the steps will generally conform to the contour of said chamber.

3. A flow control valve particularly adapted for controlling the flow of incompressible fiber-water mixtures comprising a valve body having a valve chamber therein closed at one end and open at its opposite ends and providing an outlet leading axially of said valve body, an inlet into said valve body through a wall thereof and adjacent the closed end of said valve body, a valve stem extending through the closed end of said valve body and within said valve body, axially of said outlet, and mounted for movement along said valve body, a valve plug on said stem and within said body and movable therealong, said valve plug converging from the upstream to the downstream end thereof, and having a series of steps therein of predetermined radii and length, such that a line drawn from the edge of the downstream step to the next adjacent step spaced in an upstream direction is substantially 30°, a line drawn from the next adjacent step to the next step spaced in an upstream direction will be substantially 19° and a line drawn through the edge of the next adjacent upstream step will be substantially 13° to a line extending along said step and parallel to an axial line extending along the center of said valve, and said valve chamber having an interior wall extending downstream of said inlet in the form of a converging gradual curve determined by the lines drawn through the edges of the steps of the valve plug, and cooperating with said valve plug to provide a series of axisymmetric annular flow restrictions to the flow of fluid from said inlet to said outlet as said valve plug moves toward its closed position.

4. A flow control valve particularly adapted for controlling the flow of incompressible fiber-water mixtures comprising a valve body having a valve chamber therein closed at one end and open at its opposite ends and providing an outlet leading axially of said valve body, an inlet into said valve body through a wall thereof and adjacent the closed end of said valve body, a valve stem extending through the closed end of said valve body and within said valve body, axially of said outlet, and mounted for movement along said valve body, a valve plug on said stem and within said body and movable therealong, said valve plug converging from the upstream to the downstream end thereof, and having a series of steps therein of predetermined radii and lengths, such that a line drawn from the edge of the downstream step to the next adjacent step spaced in an upstream direction is substantially 30°, a line drawn from the next adjacent step to the next step spaced in an upstream direction will be substantially 19° and a line drawn through the edge of the next adjacent upstream step will be substantially 13° to a line extending along said step and parallel to a line extending axially along the center of said valve, and said valve chamber having an interior wall extending downstream of said inlet in the form of a converging gradual curve determined by the lines drawn through the edges of the steps of the valve plug, and cooperating with said valve plug to provide a series of axisymmetric annular flow restrictions to the flow of fluid from said inlet to said outlet as said valve plug moves toward its closed position, and the edges of said steps being curved to provide a smooth and steady diminution of areas of flow restriction with increasing stem movement.

5. A plug valve in accordance with claim 4 wherein the valve plug is movable into a retracted position out of cooperative relation with said wall to provide a substantially unobstructed flow path from said inlet to said outlet.

6. A flow control valve particularly adapted for controlling the flow of incompressible fiber-water mixtures comprising a valve body having a valve chamber therein, closed at one end and open at its opposite end and providing an outlet leading axially of said valve body, an inlet into said valve body through the wall thereof and adjacent the closed end of said body, a valve stem extending axially of said valve body through said closed end and mounted for movement along said valve body, a valve plug, circular in cross section, mounted on said stem and converging from the upstream to the downstream end thereof, said valve chamber having an internal converging wall downstream of said outlet and in the form of a gradual curve of greater radius near said inlet than said outlet and generally conforming to the form of said valve plug, and said valve plug, when in the open position being spaced upstream of said valve chamber to offer no more hydraulic resistance than the hydraulic resistance offered by a 90 degree elbow and having a plurality of steps in the periphery thereof of different predetermined lengths and radii having rounded corners cooperating with said internal converging wall of said valve chamber to form a series of rounded corner axisymmetric annular restrictions to the flow of fluid through said valve chamber arranged in series of progressively decreasing diameters from the inlet to the outlet end of said valve chamber.

References Cited by the Examiner

UNITED STATES PATENTS

| Re. 17,824 | 10/1930 | Lee | 251—122 |
| 1,919,232 | 7/1933 | Lee | 251—122 |
| 1,962,520 | 6/1934 | O'Malley | 251—333 X |
| 2,489,623 | 11/1949 | Delany | 251—210 |
| 2,915,278 | 12/1959 | Crist | 251—122 |

FOREIGN PATENTS 1,098,772  2/1961  Germany.

LAVERNE D. GEIGER, *Primary Examiner.*

C. L. HOUCK, *Assistant Examiner.*